(12) United States Patent
Attalla

(10) Patent No.: US 8,713,525 B2
(45) Date of Patent: Apr. 29, 2014

(54) SOFTWARE MANAGEMENT SYSTEM FOR NETWORK DATA PROCESSING SYSTEMS

(75) Inventor: Emad Attalla, Dearborn Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 12/731,457

(22) Filed: Mar. 25, 2010

(65) Prior Publication Data

US 2011/0239189 A1   Sep. 29, 2011

(51) Int. Cl.
G06F 9/44 (2006.01)
G06F 21/00 (2013.01)
G06Q 30/00 (2012.01)

(52) U.S. Cl.
USPC ........... 717/121; 717/120; 717/168; 717/170; 705/26.35; 705/59

(58) Field of Classification Search
None
See application file for complete search history.

(56) References Cited

U.S. PATENT DOCUMENTS

| | | | |
|---|---|---|---|
| 5,499,357 A | 3/1996 | Sonty et al. | |
| 5,825,651 A | 10/1998 | Gupta et al. | |
| 5,860,007 A * | 1/1999 | Soni et al. | 717/121 |
| 5,909,581 A * | 6/1999 | Park | 717/170 |
| 6,035,305 A | 3/2000 | Strevey et al. | |
| 6,138,104 A | 10/2000 | Marchak et al. | |
| 6,223,094 B1 | 4/2001 | Muehleck et al. | |
| 6,233,493 B1 | 5/2001 | Cherneff et al. | |
| 6,247,128 B1 | 6/2001 | Fisher et al. | |
| 6,263,341 B1 | 7/2001 | Smiley | |
| 6,289,510 B1 * | 9/2001 | Nakajima | 717/170 |
| 6,363,524 B1 | 3/2002 | Loy | |
| 6,385,770 B1 | 5/2002 | Sinander | |
| 6,425,126 B1 | 7/2002 | Branson et al. | |

(Continued)

FOREIGN PATENT DOCUMENTS

WO   WO2006064252 A1   6/2006

OTHER PUBLICATIONS

Todd Martin, "Network Configuration and Change Management Software Selection for Company XYZ", [Online], May 2006, pp. 1-79, [Retrieved from Internet on Jul. 1, 2013], <http://www2.uwstout.edu/content/lib/thesis/2006/2006martint.pdf>.*

(Continued)

*Primary Examiner* — Thuy Dao
*Assistant Examiner* — Ziaul A Chowdhury
(74) *Attorney, Agent, or Firm* — Yee & Associates, P.C.; Arthur J. Samodovitz

(57) ABSTRACT

A method, data processing system, and computer program product are presented for planning upgrades to a network data processing system. A processor unit identifies configuration information for hardware and software programs for a plurality of computers in the network data processing system. The processor unit obtains end of life dates for the software programs, release dates for the replacement software programs, and prerequisites for replacement software programs for the software programs identified in the configuration information. The processor unit identifies at least one change to the plurality of computers based on the configuration information and a set of prerequisites in the prerequisites for each of a plurality of replacement software programs for a plurality of software programs in the software programs. The processor unit generates at least one upgrade plan to implement at least one change to the plurality of computers in which a number of overlaps between life cycles for the plurality of replacement software programs and life cycles for the plurality of software programs in the software programs is increased.

5 Claims, 10 Drawing Sheets

(56) References Cited

U.S. PATENT DOCUMENTS

| | | | |
|---|---|---|---|
| 6,922,684 B1 | | 7/2005 | Aldridge et al. |
| 7,055,149 B2 | | 5/2006 | Birkholz et al. |
| 7,080,371 B1 | * | 7/2006 | Arnaiz et al. ............... 717/170 |
| 7,191,435 B2 | | 3/2007 | Lau et al. |
| 7,206,708 B2 | | 4/2007 | Williams et al. |
| 7,409,676 B2 | * | 8/2008 | Agarwal et al. ............ 717/120 |
| 7,451,440 B2 | | 11/2008 | Zweifel |
| 7,469,217 B2 | | 12/2008 | Kidd et al. |
| 7,548,789 B2 | | 6/2009 | Chand et al. |
| 7,552,430 B2 | | 6/2009 | Napier et al. |
| 7,562,356 B2 | | 7/2009 | DeFolo |
| 7,568,195 B2 | | 7/2009 | Markley et al. |
| 7,581,217 B2 | | 8/2009 | Jhanwar et al. |
| 7,761,851 B2 | * | 7/2010 | Bailey et al. ............... 717/121 |
| 7,904,885 B2 | * | 3/2011 | Volkmer ...................... 717/120 |
| 8,015,114 B1 | * | 9/2011 | Nachenberg .................. 705/59 |
| 8,132,153 B2 | * | 3/2012 | Subramanyam ............. 717/121 |
| 8,271,947 B2 | * | 9/2012 | Kohno ......................... 717/121 |
| 2002/0035689 A1 | * | 3/2002 | Colvin ......................... 713/168 |
| 2002/0092008 A1 | * | 7/2002 | Kehne et al. ................. 717/168 |
| 2003/0229890 A1 | * | 12/2003 | Lau et al. ..................... 717/168 |
| 2004/0006586 A1 | * | 1/2004 | Melchione et al. .......... 709/201 |
| 2004/0010786 A1 | * | 1/2004 | Cool et al. ................... 717/170 |
| 2004/0015949 A1 | * | 1/2004 | Taylor ........................ 717/171 |
| 2004/0107417 A1 | | 6/2004 | Chia et al. |
| 2004/0267590 A1 | * | 12/2004 | Clark et al. ..................... 705/9 |
| 2005/0028153 A1 | * | 2/2005 | Anderson .................... 717/168 |
| 2005/0076333 A1 | | 4/2005 | Leclair et al. |
| 2006/0136547 A1 | * | 6/2006 | Neuhaus et al. ............. 709/203 |
| 2007/0169090 A1 | * | 7/2007 | Kang ........................... 717/168 |
| 2007/0240152 A1 | * | 10/2007 | Li et al. ....................... 717/174 |
| 2008/0148248 A1 | | 6/2008 | Volkmer et al. |
| 2008/0163092 A1 | | 7/2008 | Rao |
| 2008/0201702 A1 | | 8/2008 | Bunn |
| 2008/0209414 A1 | * | 8/2008 | Stein ........................... 717/173 |
| 2008/0222604 A1 | * | 9/2008 | Murphy ....................... 717/120 |
| 2008/0282228 A1 | * | 11/2008 | Subramanyam ............. 717/121 |
| 2008/0301663 A1 | * | 12/2008 | Bahat et al. ................. 717/170 |
| 2008/0301666 A1 | * | 12/2008 | Gordon et al. .............. 717/172 |
| 2009/0089777 A1 | | 4/2009 | Fuller et al. |
| 2009/0193407 A1 | * | 7/2009 | Lepeska ...................... 717/170 |
| 2009/0210868 A1 | | 8/2009 | Parthasarathy |
| 2010/0306319 A1 | * | 12/2010 | Brzozowski ................. 709/206 |

OTHER PUBLICATIONS

Anthony Bellissimo et al., "Secure Software Updates: Disappointments and New Challenges",[Online], 2006, pp. 37-43, [Retrieved from Internet on Jul. 1, 2013], <https://www.usenix.org/legacy/event/hotsec06/tech/full_papers/bellissimo/bellissimo.pdf>.*

BW Chatters et al., "Modelling a Software Evolution Process", [Online], 1999, pp. 1-13, [Retrieved from Internet non Jul. 1, 2013], <http://citeseerx.ist.psu.edu/viewdoc/download?doi=10.1.1.138.4230&rep=rep1&type=pdf>.*

David A. Penny, "An Estimation-Based Management Framework for Enhancive Maintenance in Commercial Software Products", [Online], 2002, pp. 1-10, [Retrieved from Internet on Jul. 1, 2013], <http://www.cs.toronto.edu/~penny/research/release-planning/papers/releaseplan.pdf>.*

Tero Kojo et al., "Towards Intelligent Support for Managing Evolution of Configurable Software Product Families", [Online], 2003, pp. 1-16, [Retrieved from Internet on Nov. 25, 2013], <http://citeseerx.ist.psu.edu/viewdoc/download?doi=10.1.1.107.2280&rep=rep1&type=pdf>.*

Fabio Massacci et al., "After-Life Vulnerabilities: A Study on Firefox Evolution, its Vulnerabilities, and Fixes", [Online], 2011, pp. 1-14, [Retrieved from Internet on Nov. 25, 2013], <http://www.artdecode.de/Papers/AfterLife.pdf>.*

Günther Ruhe et al., "Optimized Resource Allocation for Software Release Planning", [Online], IEEE-2009, pp. 109-123, [Retrieved from Internet on Nov. 25, 2013], <http://ieeexplore.ieee.org/stamp/stamp.jsp?tp=&arnumber=4641940>.*

Eya Ben Charrada, et al., "Identifying Outdated Requirements Based on Source Code Changes", [Online], IEEE 2012, pp. 61-70, [Retrieved from Internet on Nov. 25, 2013], <http://ieeexplore.ieee.org/stamp/stamp.jsp?tp=&arnumber=6345840>.*

Hicks et al., "Dynamic Software Updating", ACM Transactions on Programming Languages and Systems, 2005, pp. 1-47.

Mistry, "Simplified Upgrade Planning with Premium AutoSupport," NetApp, Tech OnTap, May 2008, 3 pages, accessed Sep. 16, 2009, http://www.netapp.com/us/communities/tech-ontap/autosupport-0508.aspx.

* cited by examiner

SOFTWARE MANAGEMENT SYSTEM FOR NETWORK DATA PROCESSING SYSTEMS

BACKGROUND

1. Field

The disclosure relates generally to data processing systems and, more specifically, to managing software programs on data processing systems. Still more specifically, the present disclosure relates to a method and apparatus for managing software programs having an end of life in a network data processing system.

2. Description of the Related Art

Network data processing systems include both hardware and software components. The different hardware and software components typically are commercial off-the-shelf products. These products are available from many different vendors. Products often have release-related information that is available at or before the time that the products are released. For example, this information may include a version number, a release number, a dependency on other products, a compatibility with other products, available patches, end of life dates, support dates, and/or other information.

In selecting products for a network data processing system, the capability of the different products to meet the requirements for an organization using the network data processing system is taken into account. Products are selected such that they are compatible with other products that may be used within the network data processing system. Compatibility of products is important to increase the stability and security of network data processing systems, as well as the usability of a network data processing system by an organization.

Software and hardware products in a network data processing system often require upgrades. For example, memory may be added to computers, new computers may be added to the network, new computers may be used to replace older computers, and other types of hardware may be upgraded. With software, new versions of software having additional features or new capabilities may be installed to replace currently used software. These upgrades may be made in the new data processing system as new releases of those products occur.

Additionally, software and hardware may need to be upgraded when an older product may no longer be supported. When new versions of software are released by a vendor, the older version of the software is typically supported only for some period of time after the release of the new version. After that point in time, the vendor may no longer provide technical support, patches, or other types of support for the older version of the software.

In upgrading software and hardware products, the compatibility of a new release of a product with the current hardware and software in the network data processing system is analyzed. This analysis is made to determine whether changes to other software and/or hardware within the network data processing system are needed to upgrade a current product to a new product.

For example, upgrading a software product, such as a word processing program, may require other upgrades other than just replacing the word processing program with a new version of the word processing program. For example, the new version of the word processing program may require a selected amount of memory and a particular type of operating system.

The different computers in the network data processing system are analyzed to determine whether the particular type of operating system and the amount of memory needed by the new version of the word processing program are present. If either of these two prerequisites for the word processing program is not present in one or more of the computers, upgrades or changes to those computers are needed to provide the needed amount of memory and the particular type of operating system.

When hundreds or thousands of products are present in a network data processing system, this analysis and planning of upgrades becomes more complex. More personnel may be needed by an organization using a network data processing system. As a result, the cost of maintaining or making changes to the network data processing system increases.

Therefore, it would be advantageous to have a method and apparatus that takes into account one or more of the issues discussed above, as well as possibly other issues.

SUMMARY

In the different illustrative embodiments, a method, data processing system, and computer program product are presented for planning upgrades to a network data processing system. A processor unit identifies configuration information for hardware and software programs for a plurality of computers in the network data processing system. The processor unit obtains end of life dates for the software programs, release dates for the replacement software programs, and prerequisites for replacement software programs for the software programs identified in the configuration information. The processor unit identifies at least one change to the plurality of computers based on the configuration information and a set of prerequisites in the prerequisites for each of a plurality of replacement software programs for a plurality of software programs in the software programs. The processor unit generates at least one upgrade plan to implement at least one change to the plurality of computers in which a number of overlaps between life cycles for the plurality of replacement software programs and life cycles for the plurality of software programs in the software programs is increased.

DETAILED DESCRIPTION

Figure 1:
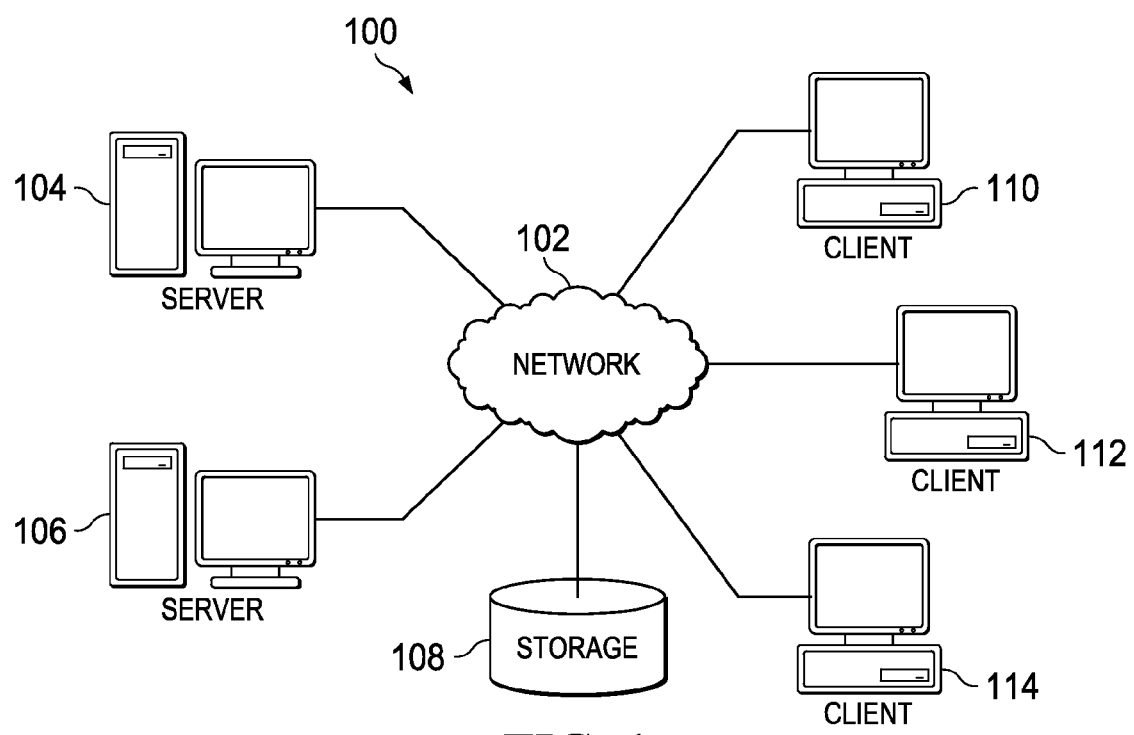
FIG. 1 is a diagram of a data processing environment in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer readable storage devices may be utilized. Examples (a non-exhaustive list) of the computer readable storage devices would include the following: a portable computer diskette, a hard disk, a random access memory (RAM), a read-only memory (ROM), an erasable programmable read-only memory (EPROM or Flash memory), a portable compact disk read-only memory (CDROM), an optical storage device, or a magnetic storage device. In addition to using a computer program product, computer program code also may be downloaded to a computer via a network.

Computer program code for carrying out operations of the present invention is written in any combination of one or more programming languages, including an object-oriented programming language, such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer is connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams and combinations of blocks in the flowchart illustrations and/or block diagrams can be implemented by computer program instructions.

These computer program instructions are provided to a processor of a general purpose computer, special purpose computer, or other programmable data processing apparatus to produce a machine, such that the instructions, which are implemented via the processor of the computer or other programmable data processing apparatus, create means for implementing the functions/acts specified in the flowcharts and/or block diagram block or blocks. These computer program instructions may also be stored in a computer readable storage device that can direct a computer or other programmable data processing apparatus to function in a particular manner, such that the instructions stored in the computer readable storage device produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which are implemented on the computer or other programmable apparatus provide processes for implementing the functions/acts specified in the flowcharts and/or block diagram block or blocks.

Figure 2:
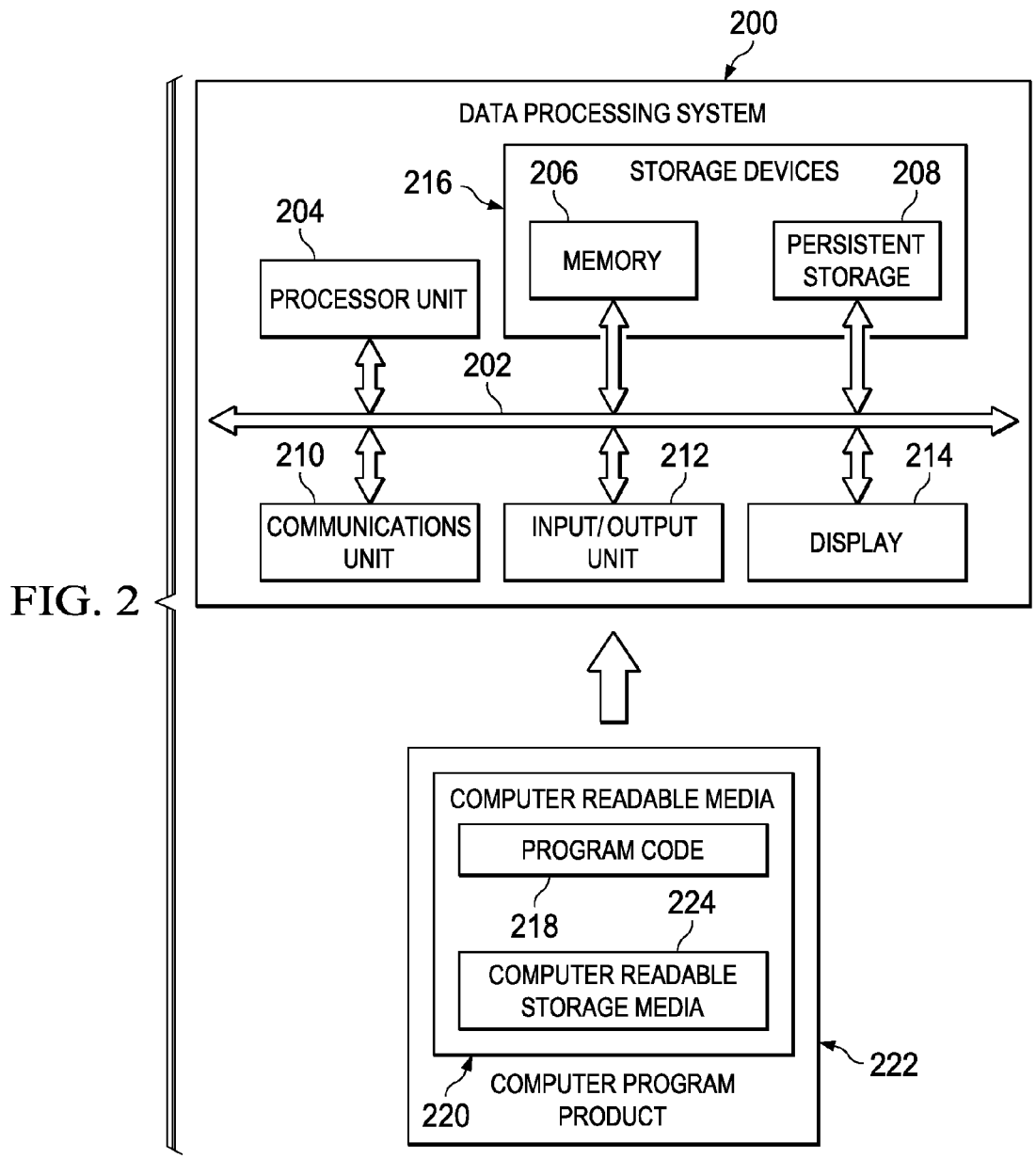
FIG. 2 is an illustration of a data processing system in accordance with an illustrative embodiment.

With reference now to the figures and, in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments are implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 are, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and/or other devices not shown.

Program code located in network data processing system 100 is stored on a computer readable storage device and downloaded to a data processing system or other device for use. For example, program code is stored on a computer readable storage device on server computer 104 and downloaded to client computer 112 over network 102 for use on client computer 112.

For example, client computers 110, 112, and 114 may run program code for a messaging program. The messaging program allows for messages to be exchanged between users at client computers 110, 112, and 114. In these examples, the messaging takes the form of instant messages for chat sessions that are held between users at client computers 110, 112, and 114. One or more illustrative embodiments may be implemented at client computers 110, 112, and 114 and/or at server computers 104 and 106 to facilitate the exchange of messages. Further, different illustrative embodiments may be implemented in one or more of these components to generate alerts to identify messages that may be relevant to particular participants in the chat session.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). A number of, when referring to items means, one or more items. For example, a number of different types of networks is one or more different types of networks. FIG. 1 is intended as an example and not as an architectural limitation for the different illustrative embodiments.

Turning now to FIG. 2, a diagram of a data processing system is depicted in accordance with an illustrative embodiment. In this depicted example, data processing system 200 is an example of one implementation for server computer 104, server computer 106, client computer 110, client computer 112, and/or client computer 114 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code, in the different embodiments, may be embodied on different physical or computer readable storage devices, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. Computer readable storage media 224 may also be non-transitory computer readable storage media.

Alternatively, program code 218 may be transferred to data processing system 200 via a network. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system via a network for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

The different illustrative embodiments recognize and take into account a number of different considerations. For example, the illustrative embodiments recognize and take into account that currently, an administrator of a network data processing system plans changes to the network data processing system. These changes may include installing new versions of software programs. A software program reaches an end of life when the software program is no longer offered by the vendor and/or when the software program is no longer supported by the vendor. New versions of the software program or other types of replacements are provided by the vendor before or at the end of life of the software program. In some cases, vendors provide information about the upcoming release of the new versions of the software programs. This information may be used to determine whether compatibility issues are present between the current hardware and/or software in the network and the new versions of the software programs.

Currently, when multiple products are present, the administrator goes to each vendor and identifies the information about the end of life date of current products as well as information about replacements for those products. This process is tedious and time consuming. The administrator then performs upgrades for products having new versions. As upgrades are performed, the administrator may determine that a particular computer needs additional changes to support a new version of a product. These changes are made to complete the upgrade from the current product to the new product.

The different illustrative embodiments recognize and take into account that it would be desirable to have a quicker and simpler system for identifying products in a network data processing system that will reach an end of life date within a selected period of time. The different illustrative embodiments also recognize and take into account that it would be advantageous to provide a system to plan changes to the network data processing system based on the life cycles for products in the network data processing system.

Thus, the illustrative embodiments provide a method and apparatus for planning upgrades to a network data processing system. A processor unit identifies configuration information for hardware and software programs for a plurality of computers in the network data processing system. The hardware and software programs are products in the network data processing system. The processor unit obtains end of life dates for the products and prerequisites for replacement products for the products identified in the configuration information from vendors for the products. The processor unit makes a determination as to whether a number of products within the products in the plurality of computers have a number of end of life dates occurring within a selected period of time.

In response to the number of products having the number of end of life dates within the selected period of time, the processor unit identifies a number of changes to the plurality of computers based on the configuration information and a set of prerequisites in the prerequisites for each of a number of replacement products for the number of products. The processor unit generates a number of upgrade plans to implement the number of changes to the plurality of computers. Each upgrade plan in the number of upgrade plans reduces a number of deployments of the number of replacement products to the network data processing system over a period of time.

Figure 3:
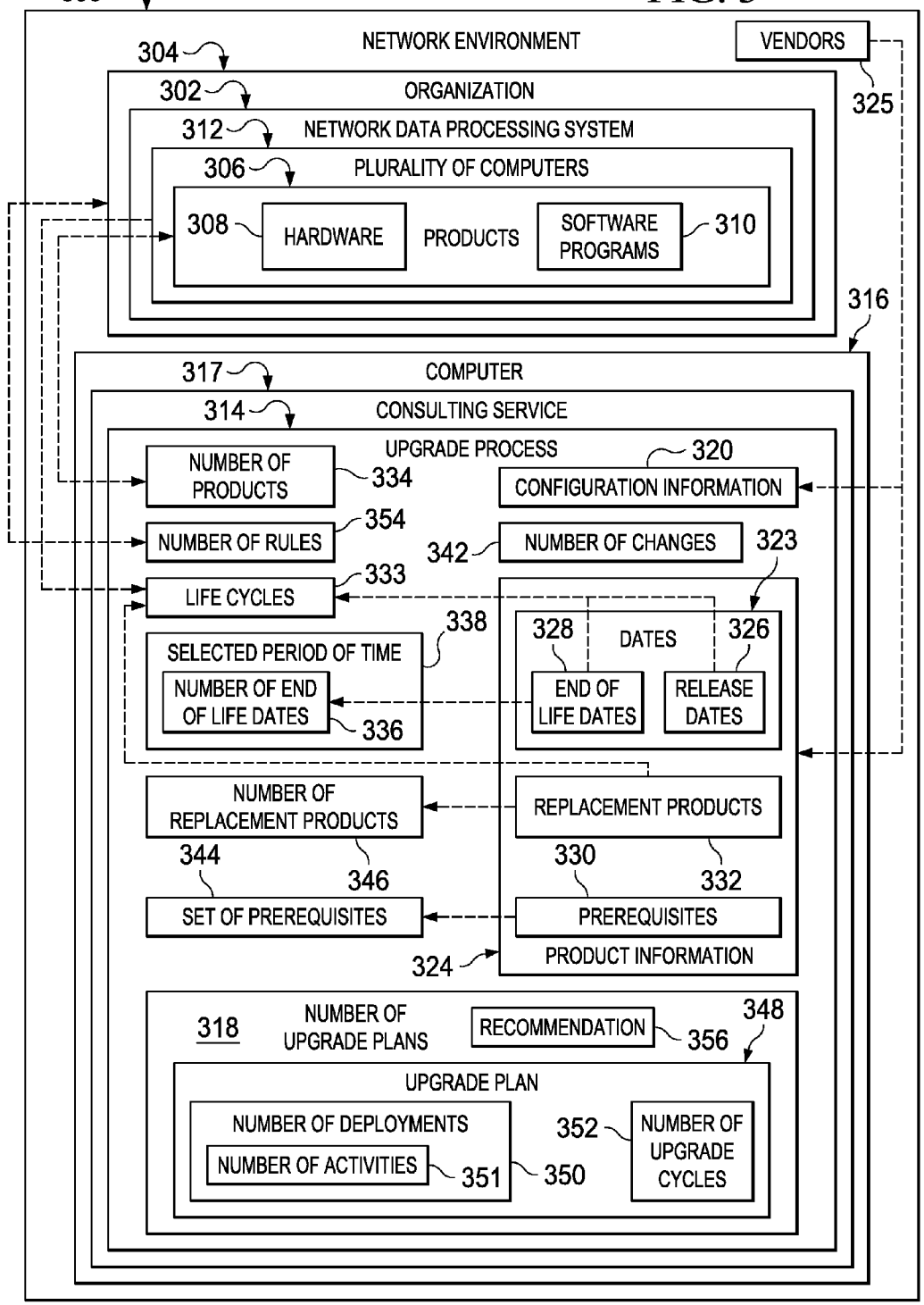
FIG. 3 is an illustration of a network environment in accordance with an illustrative embodiment.

With reference now to FIG. 3, an illustration of a network environment is depicted in accordance with an illustrative embodiment. As depicted, network environment 300 includes network data processing system 302. Network data processing system 302 is used by organization 304. Network data processing system 302 may be implemented using a data processing system, such as network data processing system 100 in FIG. 1.

Network data processing system 302 is formed from products 306. Products 306 include hardware 308 and software programs 310. Hardware 308 may take the form of plurality of computers 312 in network data processing system 302. Additionally, hardware 308 may take the form of components within plurality of computers 312. For example, without limitation, hardware 308 may include at least one of a motherboard, memory, a hard drive, a network adapter, and other suitable components. Further, hardware 308 may include other components within network data processing system 302. For example, hardware 308 may include at least one of a switch, a router, a wireless access port, a printer, and other suitable hardware components.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Software programs 310 may take a number of different forms. For example, software programs 310 may be instructions in a form that is run by a computer. Software programs 310 may include application software and systems software. For example, application software may be at least one of a word processor program, a spreadsheet program, a media player, a database application, and other suitable types of application software. Systems software may be at least one of an operating system service, an operating system, process integrators, and other suitable types of software.

In these illustrative examples, upgrade process 314 runs on computer 316. In these illustrative examples, upgrade process 314 may take the form of a computer program run on computer 316. Computer 316 may be a computer within plurality of computers 312 or a computer located remote to network data processing system 302. When computer 316 is located remote to network data processing system 302, upgrade process 314 may be used by consulting service 317 to provide number of upgrade plans 318 to organization 304. In these examples, organization 304 is a customer of consulting service 317.

In these illustrative examples, upgrade process 314 generates number of upgrade plans 318 for use in making changes to network data processing system 302. Number of upgrade plans 318 is for hardware 308 and/or software programs 310 in products 306.

Upgrade process 314 identifies configuration information 320 for products 306. In other words, upgrade process 314 identifies configuration information 320 for hardware 308 and software programs 310. In these examples, the identification of configuration information 320 for hardware 308 and software programs 310 is for plurality of computers 312 in these illustrative examples.

Configuration information 320 is information about hardware 308 and software programs 310. Configuration information 320 may include, for example, a vendor identifier, a location, and other suitable information. For example, for a software program, configuration information 320 may include an identification of a vendor, an installation date, a version number, an identification of a computer running the software program, and/or other suitable information. As another illustrative example, with a processor unit, configuration information 320 may include an identification of the vendor, a model number, a clock speed, a cache size, and/or other suitable information.

Upgrade process 314 also obtains product information 324. Product information 324 may be obtained from vendors 325 for plurality of computers 312. Product information 324 includes identification of at least one of dates 323, replacement products 332, prerequisites 330 for replacement products 332, and other suitable information. Dates 323 include at least one of release dates 326, end of life dates 328, and other types of dates. Release dates 326 are dates at which products 306 and/or replacement products 332 are made available by vendors 325. End of life dates 328 indicate dates after which products 306 and/or replacement products 332 are no longer made available by vendors 325 and/or dates after which products 306 are no longer supported by vendors 325. In some examples, end of life dates 328 may also indicate dates after which vendors no longer provide a certain level of support. In other examples, end of life dates 328 for hardware 308 may be end of lease dates.

In some illustrative examples, vendors 325 may not have end of life dates 328 for all of products 306 and/or replacement products 332. Update process 314 may then select dates for the end of life dates not provided by vendors 325. This selection may be made using at least one of a policy for organization 304, a policy for consulting service 317, a policy for vendors 325, and a default end of life date. For example, a policy may be present for selecting an end of life date for a product that is about four years after a release date for the product. Another policy may be present for selecting an end of life date for a product that is the end of a warranty for the product. In these illustrative examples, a default end of life date may be, for example, a date after a selected period of time after the deploying of products 306 in network data processing system 302.

Replacement products 332 are for products 306. A replacement product is a product that replaces a current product within network data processing system 302 in these illustrative examples. For example, when a replacement product is a software program, that software program is the replacement for the current software program used in network data processing system 302. The replacement software program may be, for example, a new version of the current software program. In other examples, the replacement software program may be an entirely new software program meant to replace the existing software program.

Replacement products 332 for products 306 have prerequisites 330. In these examples, prerequisites 330 may include an identification of hardware and software programs needed for replacement products 332 to be used. For example, prerequisites 330 may identify an amount of memory, a processor speed, a number of types of operating systems supported, a number of related software programs needed for the replacement product to operate, devices needed, and/or other suitable information needed for the replacement product to be used within plurality of computers 312.

Product information 324 also may include other information, such as, for example, without limitation, a new product release date, patches for a product, and other suitable information about a product.

Upgrade process 314 may obtain product information 324 from vendors 325 for plurality of computers 312 in a number of different ways. For example, upgrade process 314 may access websites for vendors 325 to obtain product information 324. In other illustrative examples, vendors 325 may send product information 324 to upgrade process 314. As a specific example, vendors 325 may access a website and enter product information 324 into a database for use by upgrade process 314.

In these illustrative examples, upgrade process 314 identifies life cycles 333 from release dates 326 and end of life dates 328. Life cycles 333 are for products 306 and replacement products 332. Life cycles 333 are the periods of time during which a product is available for sale and/or supported by a vendor. As explained in more detail below, upgrade process 314 determines whether any computers within plurality of computers 312 have any products within products 306 reaching an end of life date in end of life dates 328 within selected period of time 338. Selected period of time 338 may take a number of different forms. For example, without limitation, selected period of time 338 may be a quarter, a month, a year, or some other suitable selected period of time.

Upgrade process 314 may identify number of products 334 within products 306 in plurality of computers 312 having number of end of life dates 336 in end of life dates 328 occurring within selected period of time 338. Number of products 334 may be in one or more of plurality of computers 312. Upgrade process 314 also identifies number of replacement products 346 for number of products 334. In response to identifying number of products 334 and number of replacement products 346, upgrade process 314 identifies number of changes 342 based on configuration information 320 and set of prerequisites 344 in prerequisites 330 for each replacement product in number of replacement products 346 for number of products 334. Number of changes 342 may be changes to hardware and/or software programs for one or more of plurality of computers 312.

In these illustrative examples, a set, when used with reference to an item, may include zero or more items. As a result, in some cases, set of prerequisites 344 may include no requirements or dependencies for operation of a replacement product in number of replacement products 346. A dependency is the degree to which a product relies on one or more other products to operate.

Upgrade process 314 generates upgrade plan 348 in number of upgrade plans 318 to implement number of changes 342 to plurality of computers 312 for each replacement product in number of replacement products 346 for number of products 334. In these illustrative examples, upgrade plan 348 may comprise number of deployments 350. Each deployment within number of deployments 350 may be for one or more of number of replacement products 346. In other words, a deployment makes one on or more replacement products available for use in network data processing system 302.

Each deployment comprises number of activities 351. Number of activities 351 is used to make one or more replacement products available for use in network data processing system 302. These activities in number of activities 351 may include, for example, without limitation, checking for prerequisites, making changes to hardware as needed, installing the software for a replacement product, testing, troubleshooting, and/or other suitable activities.

Each deployment in number of deployments 350 may occur during an upgrade cycle in number of upgrade cycles 352. An upgrade cycle is the period of time during which a deployment to network data processing system 302 occurs. In other words, an upgrade cycle is the period of time during which one or more replacement products in number of replacement products 346 may be installed in network data processing system 302.

Upgrade process 314 generates number of upgrade plans 318 in a manner that allows organization 304 to select an upgrade plan within number of upgrade plans 318 based on number of rules 354. Number of rules 354 is rules that organization 304 has selected or specified for deploying products on network data processing system 302.

For example, a rule may be that the deployment of one or more products into network data processing system 302 must take at least some minimum period of time. Organization 304 may select a minimum period of time as one that allows for a desired amount of testing and troubleshooting for the product. Another example of a rule may be that the deployment of a product into network data processing system 302 may not occur during certain periods of time. For example, if organization 304 is an accounting firm, a rule may be present stating that deployments cannot occur during March and April. Still further, a rule may be that a deployment must be for no less than a selected number of products. Yet another rule may be that an upgrade plan may comprise no more than a selected number of deployments.

Still further, organization 304 may have a rule based on an arrangement with vendors 325. This rule may, for example, allow organization 304 to specify an end of life date for a product and/or replacement product provided by a vendor in vendors 325.

In these illustrative examples, upgrade process 314 may make recommendation 356 to organization 304. Recommendation 356 may be for at least one of number of upgrade plans 318 for deploying number of replacement products 346 in network data processing system 302. Recommendation 356 may be based on number of rules 354 for organization 304. Recommendation 356 may be made to increase the number of products that are installed in a single deployment for network data processing system 302.

In one illustrative example, recommendation 356 may recommend that organization 304 use a particular upgrade plan in number of upgrade plans 318. In this illustrative example, this particular upgrade plan reduces a total number of deployments needed for making available number of replacement products 346 in network data processing system 302. In other words, more than one product may be deployed Upgrade process 314 may be run periodically on network data processing system 302 in the different illustrative examples. In other illustrative examples, upgrade process 314 may be initiated based on an event. This event may be a periodic event. In other illustrative examples, the event may be a user input requesting an analysis of network data processing system 302. This input may be from a customer of consulting service 317.

The illustration of network environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, although the illustrative examples depict upgrade process 314 located in computer 316 and used by consulting service 317, upgrade process 314 may be implemented in a number of locations. For example, in some illustrative examples, upgrade process 314 may run on a computer within plurality of computers 312 in network data processing system 302. In still other illustrative examples, a portion of upgrade process 314 may run on plurality of computers 312 in network data processing system 302 to obtain configuration information 320. Other portions of upgrade process 314 may run on computer 316 to perform the analysis to generate number of upgrade plans 318.

In the different illustrative examples, $U(P1_n, P2_n)$ is a recommended upgrade cycle with a start date and end date for products P1, P2. One or more upgrade cycles form an upgrade plan. The recommended upgrade cycle is generated using the following algorithm:

$SD(P1_n, P2_n)$ is the start date for when to upgrade current versions of product P1 and product P2, where n indicates a current version.

$DD(P1_n, P2_n)$ is the deadline date for when to upgrade current versions of product P1 and product P2.

$R(P1_{n+1})$ is the release date of a replacement product for product P1 that is compatible with the other products in the network data processing system, where n+1 indicates a new version.

$EOL(P1_n)$ is the end of life date of the current version of product P1.

$R(P_{n+1}) < EOSL(P_n)$ for all products.

MUP is the minimum upgrade cycle period required for a network data processing system. In other words, MUP is the minimum period of time during which a deployment may be performed. For example, if MUP is 60 days, the activities performed for a deployment must take at least 60 days. This minimum amount of time may be set to allow for a desired amount of testing and troubleshooting.

If $(Max(R(P1_{n+1}), R(P2_{n+1})) \leq Min(EOL(P1_n), EOL(P2_n))$
and $Min(EOL(P1_n), EOL(P2_n)) \geq Max(R(P1_{n+1}), R(P2_{n+1}))$
and $DD(P1_n, P2_n) - SD(P1_n, P2_n) \geq MUP$
and $P1_{n+1}$ and $P2_{n+1}$ are compatible with each other, then
$U(P1_n, P2_n) = [SD(P1_n, P2_n), DD(P1_n, P2_n)]$
where
$SD(P1_n, P2_n) = Max(R(P1_{n+1}), R(P2_{n+1}))$
$DD(P1_n, P2_n) = Min(EOL(P1_n), EOL(P2_n))$
else if $(Max(R(P1_{n+1}), R(P2_{n+1})) > Min(EOL(P1_n), EOL(P2_n))$
or $Min(EOL(P1_n), EOL(P2_n)) < Max(R(P1_{n+1}), R(P2_{n+1}))$
or $(DD(P1_n, P2_n) - SD(P1_n, P2_n)) < MUP$
$U(P1_n, P2_n) = \{[R(P1_{n+1}), EOL(P1_n)], [R(P2_{n+1}), EOL(P2_n))\}$
For 3 products:
$U(P1_n, P2_n, P3_n) = Min(U(P1_n, P2_n), U(P2_n, P3_n), U(P1_n, P3_n))$
where:
Min( ) is the Minimum number of unique upgrade cycles where P1 through P3 can be upgraded.

The formula can be extended for a network data processing system with N products in 2 steps:
Step 1:
For i=1 to N−1
For j=i+1 to N
Store Unique $U(Pi_n, Pj_n)$ in List L
Step 2:
Find Min(L) as the minimum number of upgrade cycles in L where P1 to PN can be upgraded while joining overlapping upgrade cycles.

A recommended upgrade plan can be a single upgrade cycle where a group of products in a network data processing system can be deployed at once. More than one upgrade cycle may be present when there is no overlapping of release and end of life dates of two or more products or if there is no compatibility between the replacement products for two or more products.

The recommended upgrade plan is the open window or windows available to upgrade one or more products. An organization using a network data processing system will need to work within these windows in order to keep its products fully supported and to extend the supportability of the network data processing system.

The supportability of a network data processing system is the period of time during which all products in the network data processing system are supported. This support may be, for example, the product being available from a vendor, the vendor providing technical support for the product, and/or some other suitable type of support. The supportability of a network data processing system ends at the earliest end of life date in the plurality of end of life dates for the plurality of products in the network data processing system. The supportability of the network data processing system is important to the security, reliability, and stability of the network data processing system.

A number of upgrade plans may also be generated for making theoretical changes to a network data processing system. For example, a consulting service may generate a number of upgrade plans for an organization to allow the organization to plan and prepare for future upgrades.

Figure 4:
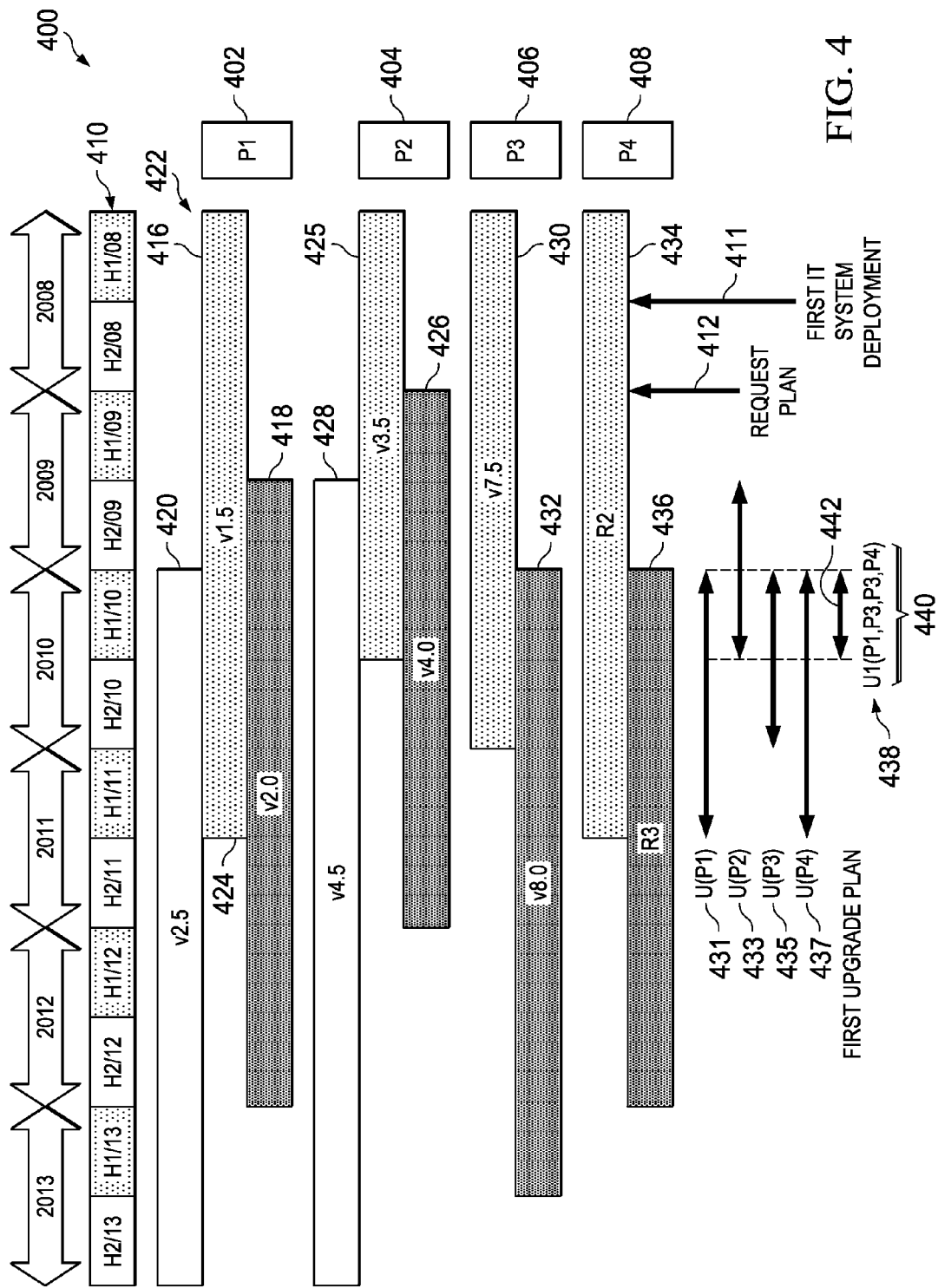
FIG. 4 is a diagram of an upgrade plan in accordance with an illustrative embodiment.

With reference now to FIG. 4, an illustration of an upgrade plan is depicted in accordance with an illustrative embodiment. Display 400 is an example of a presentation of an upgrade plan within number of upgrade plans 318 in FIG. 3. As depicted, display 400 may be created using upgrade process 314 in FIG. 3. Display 400 may be displayed on display 214 in data processing system 200 in FIG. 2.

In this example, display 400 is for product P1 402, product P2 404, product P3 406, and product P4 408. Product P1 402, product P2 404, product P3 406, and product P4 408 are software programs for a network data processing system, such as, for example, network data processing system 302 in FIG. 3.

Timeline 410 represents time. In these examples, timeline 410 is divided into six month intervals. Each interval for a year is indicated by H1 and H2. H1 denotes the first half of the year, while H2 denotes the second half of the year.

In this illustrative example, deployment of product P1 402, product P2 404, product P3 406, and product P4 408 into a network data processing system was made at time 411. Time 411 is at the beginning of the second half of year 2008. A request for an upgrade plan is made at time 412. Time 412 is at the beginning of the first half of year 2009 in this example. The request may be made by, for example, organization 304 in FIG. 3, for an upgrade plan from consulting service 317.

In this depicted example, line 416, line 418, and line 420 illustrate life cycles for different versions of product P1 402. Line 416 is for version 1.5 of product P1 402. Version 1.5 of product P1 402 is a current product. Line 418 is for version 2.0 of product P1 402, and line 420 is for version 2.5 of product P1 402. Version 2.0 and version 2.5 of product P1 402 are replacement products.

As one example, end 422 of line 416 is the release date for version 1.5 of product P1 402. End 424 of line 416 is an end of life date for version 1.5 of product P1 402. The release date is the date at which a product is made available to customers by a vendor. In these illustrative examples, the end of life date is the date after which a product is no longer supported. In other illustrative examples, the end of life date may be a date after which a product is no longer sold or a date after which extended support for the product is no longer provided.

Lines 425, 426, and 428 represent life cycles of different versions of product P2 404. Line 425 is for version 3.5 of product P2 404. Version 3.5 of product P2 404 is a current product. Line 426 is for version 4.0 of product P2 404, and line 428 is for version 4.5 of product P2 404. Version 4.0 and version 4.5 of product P2 404 are replacement products.

Line 430 and line 432 represent life cycles for different versions of product P3 406. Line 430 is for version 7.5 of product P3 406. Line 432 is for version 8.0 of product P3 406. Version 7.5 of product P3 406 is a current product, while version 8.0 is a replacement product. Line 434 and line 436 represent life cycles for different versions of product P4 408. Line 434 is for version R2 of product P4 408. Line 436 is for version R3 of product P4 408. Version R2 of product P4 408 is a current product, while version R3 is a replacement product.

In this example, version 2.0 of product P1 402 is released at the second half of year 2009. Version 2.5 of product P1 402 is released at the first half of year 2010. Version 4.0 of product P2 404 is released at the first half of year 2009. Version 2.5 of product P1 402 is released at the first half of year 2010. Version 4.5 of product P2 404 is released at the second half of year 2009. Version 8.0 of product P3 406 is released at the first half of year 2010. Version R3 of product P4 408 is released at the first half of year 2010.

Each of product P1 402, product P2 404, product P3 406, and product P4 408 may be upgraded from a current product to a replacement product at any point in time after the release of the replacement product. As can be seen with the different lines representing life cycles, the replacement products may be deployed at six different time periods. These deployments are performed to upgrade each of the current products to a replacement product during the year 2009 and the year 2010. In this illustrative example, upgrade plan 438 is generated to reduce the number of deployments to one deployment that can occur during the first half of year 2010. In other words, upgrade plan 438 allows each of product P1 402, product P2 404, product P3 406, and product P4 408 to be upgraded from a current product to a replacement product in one deployment.

As depicted in this example, display 400 presents upgrade cycle 431, upgrade cycle 433, upgrade cycle 435, and upgrade cycle 437. Upgrade cycle 431 is for product P1 402. Upgrade cycle 433 is for product P2 404. Upgrade cycle 435 is for product P3 406. Upgrade cycle 437 is for product P4 408. The start date for each of these upgrade cycles is the latest release date in the number of release dates for the number of replacement products. The end date for each of these upgrade cycles is the end of life date for the current product.

In this illustrative example, display 400 recommends upgrade plan 438. Upgrade plan 438 includes deployment 440 for version 2.5 of product P1 402, version 4.5 of product P2 404, version 8.0 of product P3 406, and version R3 of product P4 408. Deployment 440 is planned for upgrade cycle 442. Upgrade cycle 442 is selected as the greatest period of time in which upgrade cycle 431, upgrade cycle 433, upgrade cycle 435, and upgrade cycle 437 overlap. In other words, the overlapping time periods for upgrade cycle 431, upgrade cycle 433, upgrade cycle 435, and upgrade cycle 437 are merged to form upgrade cycle 442.

Upgrade cycle 442 is 6 months in this illustrative example. Further, in this depicted example, a rule is present in which the length of an upgrade cycle for a deployment cannot be less than 90 days to allow for adequate resource allocation and testing.

In this example, lines 416, 425, 430, and 434 for the current products indicate that without any upgrades, the supportability for network data processing system comprising product P1 402, product P2 404, product P3 406, and product P4 408 ends in the middle of year 2010. This date is the end of life date for version 3.5 of product P2 404. However, with deployment 440 in upgrade plan 438, the supportability of the network data processing system comprising product P1 402, product P2 404, product P3 406, and product P4 408 is extended until the end of year 2012. This date is the end of life date for version R3 of product P4 408.

Figure 5:
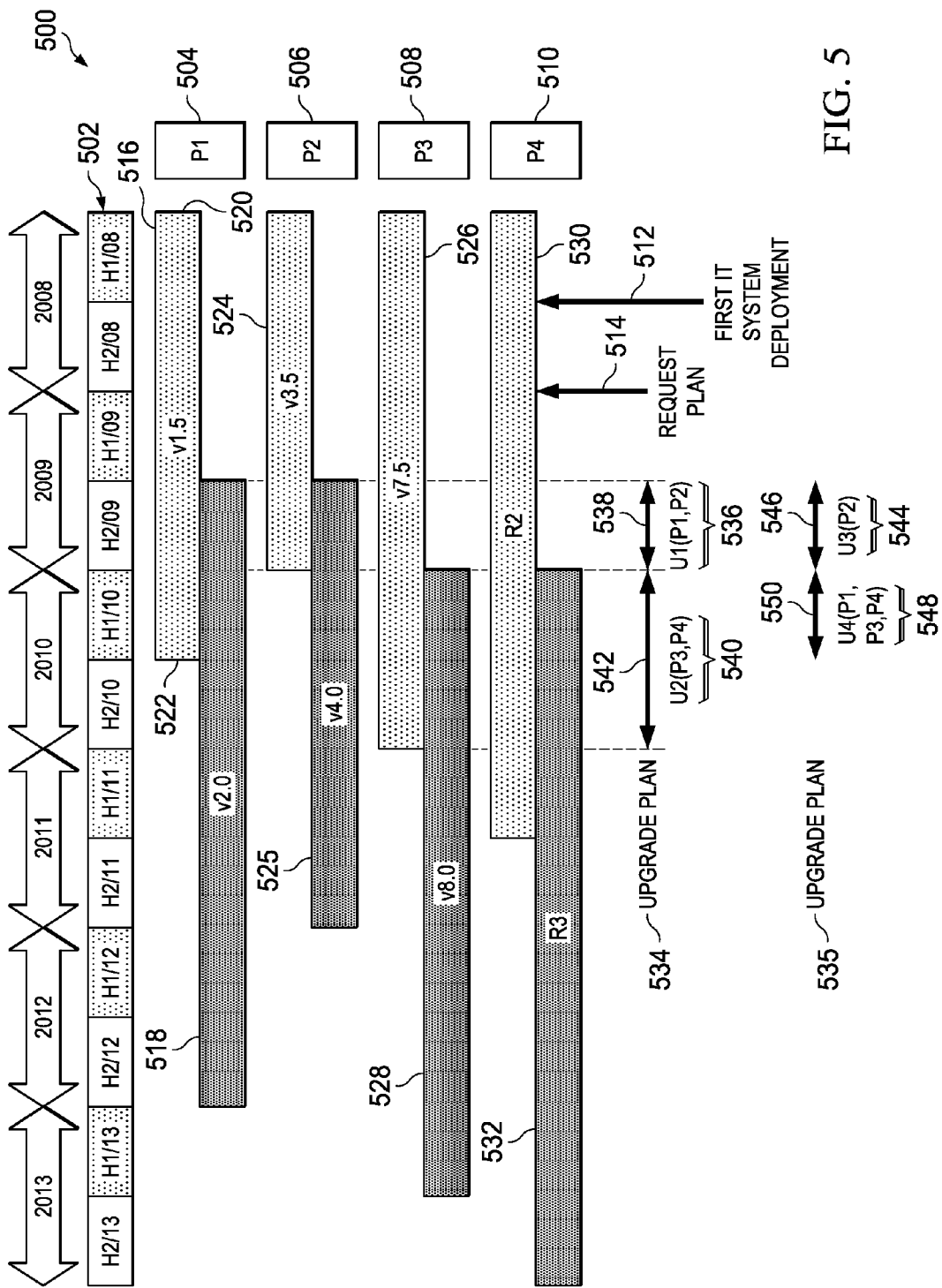
FIG. 5 is a diagram of deployment plans in accordance with an illustrative embodiment.

With reference now to FIG. 5, an illustration of upgrade plans is depicted in accordance with an illustrative embodiment. In this example, display 500 is an example of a presentation of upgrade plans within number of upgrade plans 318 in FIG. 3. Display 500 may be displayed on display 214 in data processing system 200 in FIG. 2.

In this example, timeline 502 represents time from year 2008 to year 2013. Display 500 presents upgrade plans for product P1 504, product P2 506, product P3 508, and product P4 510. As depicted, product P1 504, product P2 506, product P3 508, and product P4 510 were deployed in a network data processing system at time 512. A request for an upgrade plan is made at time 514 in these examples. Time 512 is at the middle of year 2008. Time 514 is at the end of year 2008.

Line 516 and line 518 represent life cycles for different versions of product P1 504. For example, line 516 represents a life cycle of version 1.5 of product P1 504. Line 518 represents a life cycle for version 2.0 of product P1 504. The first end of the line represents a release date for the product. The other end of the line represents an end of life date of the particular product. For example, end 520 of line 516 represents the release date for version 1.5 of product P1 504. In this example, version 1.5 of product P1 504 was released at the beginning of year 2008. End 522 of line 516 represents an end of life date for version 1.5 of product P1 504. In this example, the end of life date is in the middle of year 2010. In this example, the end of life is the time after which a product is no longer supported by the vendor. In other illustrative examples, the end of life date may be a time after which a product is no longer sold.

Line 524 and line 525 represent life cycles of different versions of product P2 506. Line 526 and line 528 represent life cycles of different versions of product P3 508. Line 530 and line 532 represent life cycles for different versions of product P4 510. As can be seen, product P1 504 will need to be upgraded from version 1.5 to version 2.0 by the end of the first half of year 2010. Product P2 506 will need to be upgraded from version 3.5 to version 4.0 by the end of year 2009. Product P3 508 will need to be upgraded from version 7.5 to version 8.0 by the end of year 2010. Product P4 510 will need to be upgraded from version R2 to version R3 by the end of the first half of year 2011.

With these life cycles, four deployments for upgrading each of the products are usually required. In other words, changes to the network data processing system may be required at four different periods of time to upgrade the products in this example without using upgrade process 314 in FIG. 3.

In this illustrative example, upgrade plan 534 and upgrade plan 535 are presented in display 500. Upgrade plan 534 includes deployment 536 and deployment 540. Deployment 536 is planned for upgrade cycle 538, and deployment 540 is planned for upgrade cycle 542. In these examples, upgrade cycle 538 is six months, and upgrade cycle 542 is one year. As illustrated, deployment 536 involves deploying version 2.0 of product P1 504 and version 4.0 of product P2 506 during upgrade cycle 538. Deployment 540 involves deploying version 8.0 of product P3 508 and version R3 of product P4 510 occur during upgrade cycle 542.

Upgrade plan 535 includes deployment 544 and deployment 548. Deployment 544 is planned for upgrade cycle 546, and deployment 548 is planned for upgrade cycle 550. Upgrade cycle 546 and upgrade cycle 550 are six months each. With upgrade plan 535, deployment 544 of version 4.0 of product P2 506 occurs during upgrade cycle 546. Deployment of version 2.0 of product P1 504, version 8.0 of product P3 508, and version R3 of product P4 510 occurs during upgrade cycle 550.

Both upgrade plan 534 and upgrade plan 535 reduce the number of deployments needed to upgrade the products as compared to individually deploying each product. An organization, such as organization 304 in FIG. 3, may select the particular upgrade plan desired based on rules, preferences, a policy, or some other suitable factors.

In upgrade cycle 538 and upgrade cycle 542, the supportability of the network data processing system is extended until the end of year 2010 and until the end of year 2011, respectively. In upgrade cycle 546 and upgrade cycle 550, the supportability of the network data processing system is extended until the middle of year 2010 and until the end of year 2011, respectively. In this manner, while both upgrade cycle 538 of upgrade plan 534 and upgrade cycle 546 of upgrade plan 535 are planned for the second half of year 2009, upgrade cycle 538 provides longer supportability for the network data processing system comprising the products. Further, upgrade cycle 542 of upgrade plan 534 is longer than the upgrade cycles of upgrade plan 535. The additional time in upgrade cycle 542 may allow longer testing and troubleshooting for deployment of the products.

Figure 6:
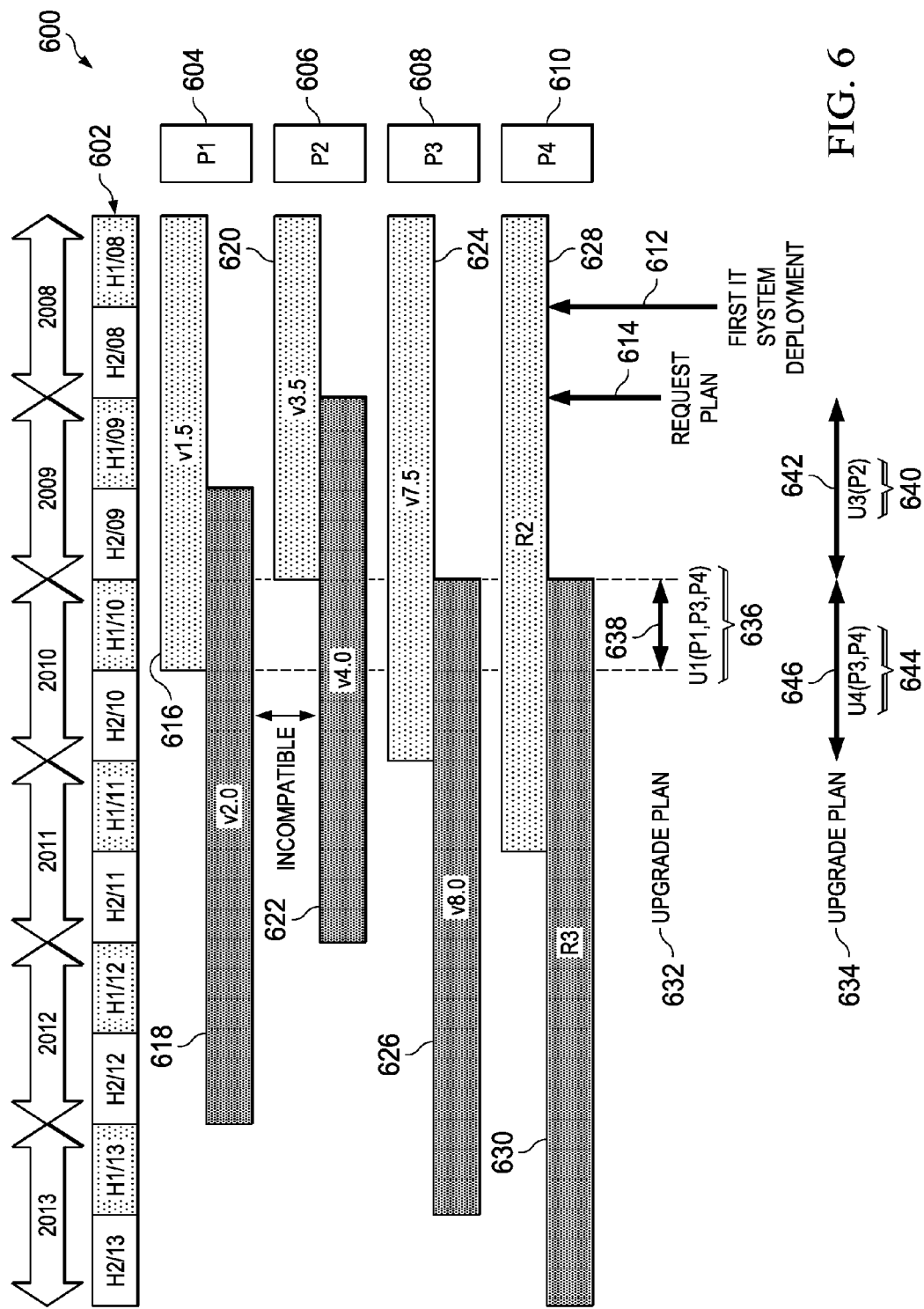
FIG. 6 is an illustration of upgrade plans in accordance with an illustrative embodiment.

With reference next to FIG. 6, an illustration of upgrade plans is depicted in accordance with an illustrative embodiment. In this illustrative example, display 600 is an example of a presentation of upgrade plans within number of upgrade plans 318 in FIG. 3. As depicted, display 600 may be created using upgrade process 314 in FIG. 3. Display 600 may be displayed on display 214 in data processing system 200 in FIG. 2.

In this example, timeline 602 represents time from year 2008 to year 2013. Display 600 is for product P1 604, product P2 606, product P3 608, and product P4 610. In this example, the deployment of these products in a network data processing system, such as network data processing system 302 in FIG. 3, was performed at time 612. Time 612 is in the middle of year 2008. Request for deployment plans to upgrade these products was made at time 614. Time 614 is at the end of year 2008.

Line 616 represents the life cycle for version 1.5 of product P1 604. Line 618 represents the life cycle for version 2.0 of product P1 604. Line 620 represents the life cycle for version 3.5 of product P2 606. Line 622 represents the life cycle for version 4.0 of product P2 606. Line 624 represents the life cycle for version 7.5 of product P3 608. Line 626 represents the life cycle for version 8.0 of product P3 608. Line 628 represents the life cycle for version R2 of product P4 610. Line 630 represents the life cycle for version R3 of product P4 610.

In this example, version 2.0 of product P1 604 is not compatible with version 4.0 of product P2 606. In this example, the length of a deployment cannot be less than 90 days.

In this example, two upgrade plans are presented in display 600. Upgrade plan 632 and upgrade plan 634 are present in display 600. Upgrade plan 632 recommends a single deployment 636 of version 2.0 of product P1 604, version 8.0 of product P3 608, and version R3 of product P4 610 during upgrade cycle 638. Upgrade plan 634 recommends two deployments for version 4.0 of product P2 606, version 8.0 of product P3 608, and version R3 of product P4 610. Deployment 640 of product P2 606 occurs during upgrade cycle 642. Deployment 644 of product P3 608 and product P4 610 occurs during upgrade cycle 646.

Upgrade plan 634 extends the usability of the network data processing system another six months until the middle of year 2010. In other words, with upgrade plan 634, the supportability of the network data processing system comprising the products is extended until the middle of year 2010. The middle of year 2010 is the end of life date for version 1.5 of product P1 604. However, with upgrade plan 632, the supportability of the network data processing system comprising the products only extends until the end of year 2009. The end of year 2009 is the end of life date for version 3.5 of product P2 606.

In this manner, with upgrade plan 634, the organization may have an opportunity to explore additional alternatives. For example, the organization may request an extension of support for version 1.5 of product P1 604 from the vendor. Alternatively, the organization may replace product P1 604 with another similar product from a different vendor or the same vendor that is compatible with version 4.0 of product P2 606.

Figure 7:
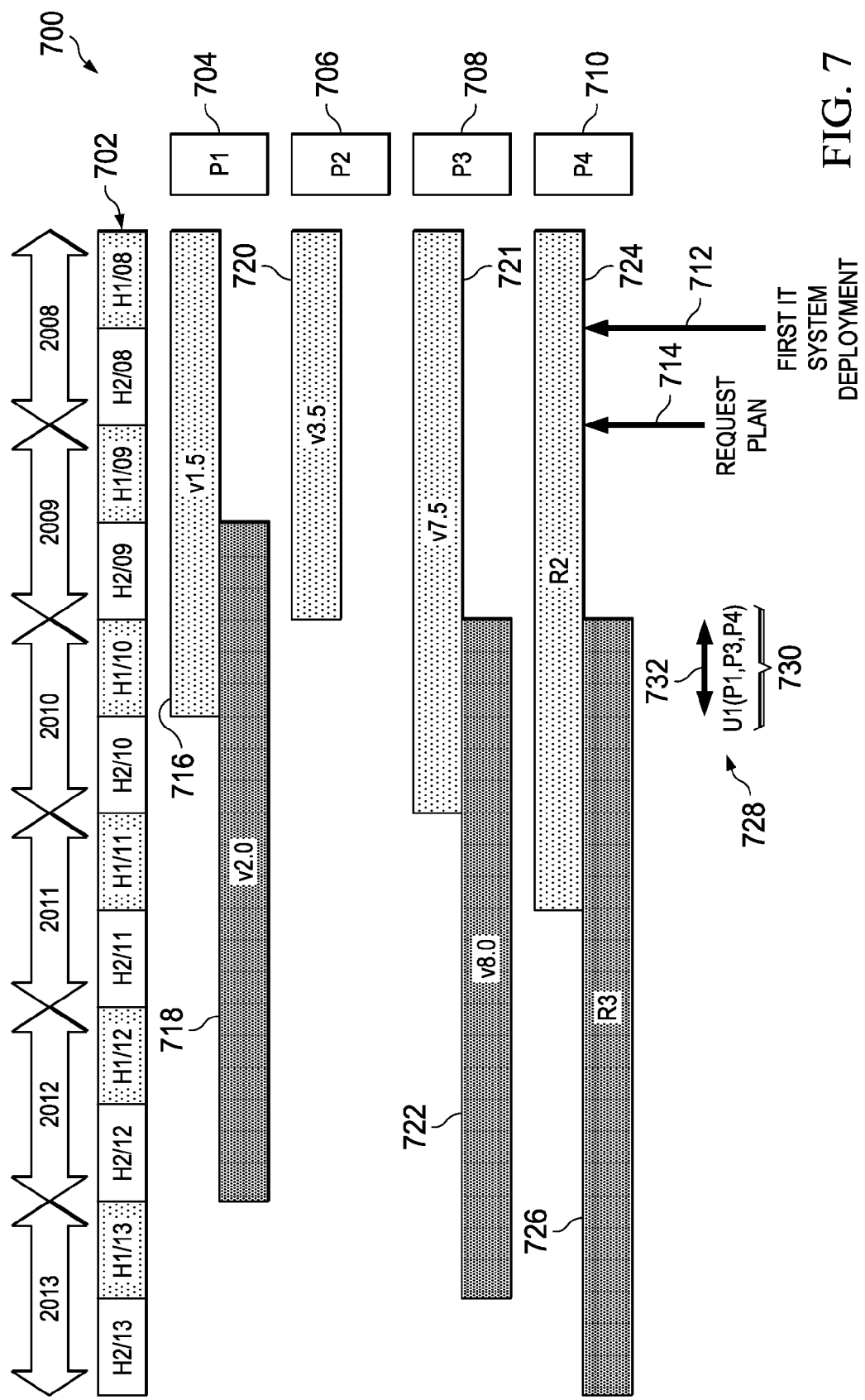
FIG. 7 is an illustration of upgrade plans in accordance with an illustrative embodiment.

Turning now to FIG. 7, an illustration of an upgrade plan is depicted in accordance with an illustrative embodiment. In this example, display 700 presents an upgrade plan in number of upgrade plans 318 in FIG. 3. Display 700 may be presented on display 214 in data processing system 200 in FIG. 2. In these examples, the upgrade plan in display 700 may be generated using upgrade process 314 in FIG. 3.

Timeline 702 illustrates time from year 2008 to year 2013. In this example, display 700 presents an upgrade plan for product P1 704, product P2 706, product P3 708, and product P4 710. As illustrated, all of the products were deployed at time 712. A request for an upgrade plan was made at time 714.

Line 716 represents the life cycle for version 1.5 of product P1 704. Line 718 represents the life cycle for version 2.0 of product P1 704. Line 720 represents the life cycle for version 3.5 of product P2 706. Product P2 706 has no other versions. Further, version 3.5 of product P2 706 has an end of life date at the end of year 2009. Line 721 represents the life cycle for version 7.5 of product P3 708. Line 722 represents the life cycle for version 8.0 of product P3 708. Line 724 represents the life cycle for version R2 of product P4 710. Line 726 represents the life cycle for version R3 of product P4 710.

In this example, upgrade plan 728 has deployment 730 occurring during upgrade cycle 732. Product P1 704, product P3 708, and product P4 710 are upgraded during upgrade cycle 732. However, at the end of life of product P2 706, product P2 706 requires a replacement with a different product. Alternatively, the organization may request an extension of support for product P2 706.

The illustrations of the different displays of upgrade plans in FIGS. 4-7 have been presented for purposes of illustrating some examples of upgrade plans. These displays are not meant to limit the manner in which upgrade plans may be presented in other illustrative embodiments. For example, in some examples, the timeline may be divided into quarters, months, and other periods of time other than the half years illustrated in these examples.

Figure 8:
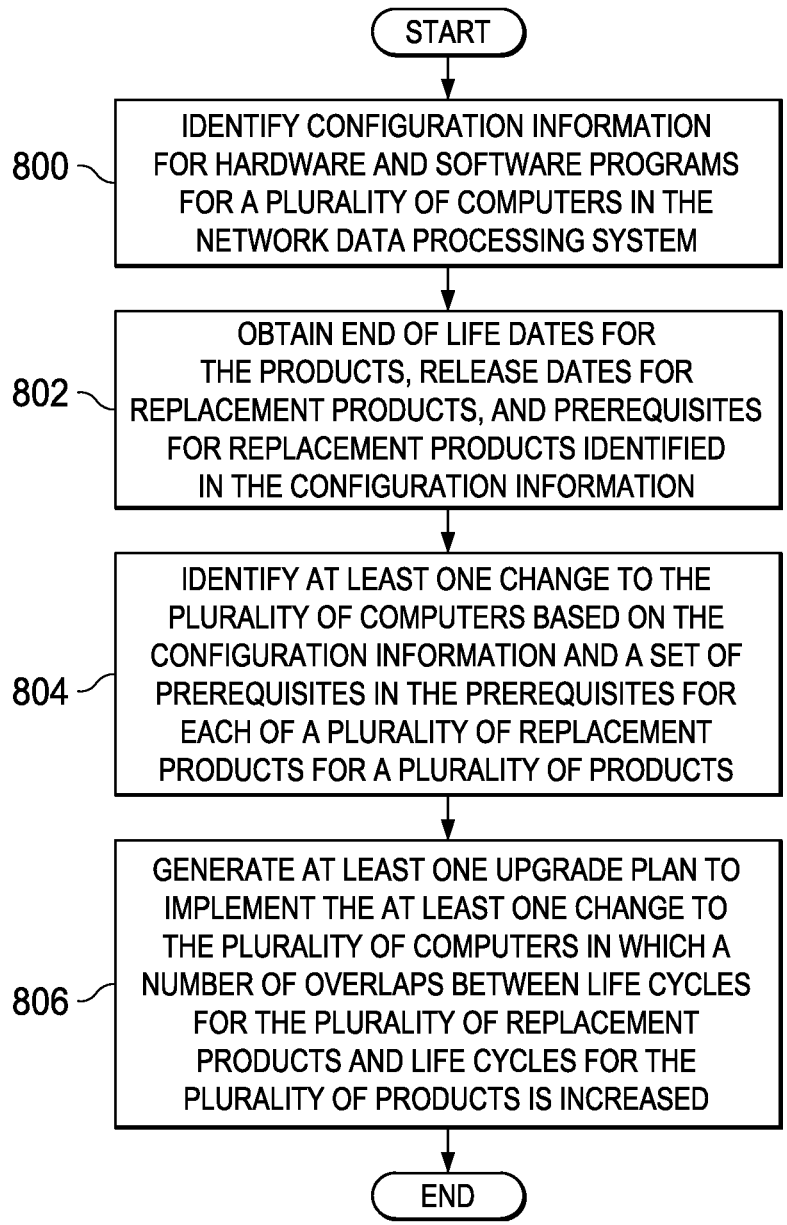
FIG. 8 is a flowchart of a process for planning upgrades to a network data processing system in accordance with an illustrative embodiment.

Turning next to FIG. 8, a flowchart of a process for planning upgrades to a network data processing system is depicted in accordance with an illustrative embodiment. The process illustrated in FIG. 8 may be implemented in network environment 300 in FIG. 3. In particular, the process may be implemented in upgrade process 314 in FIG. 3 using program code configured to be run by a processor unit in a data processing system, such as computer 316.

The process begins with upgrade process 314 identifying configuration information 320 for hardware and software programs for plurality of computers 312 in network data processing system 302 (step 800). Step 800 may be initiated in response to an event. The event may take various forms. For example, the event may be a periodic event, such as the passing of six months, three months, or some other period of time. Additionally, the event may be initiated by a request from a customer or other user. In these examples, the hardware and the software programs are products 306 in network data processing system 302.

Upgrade process 314 then obtains end of life dates 328 for products 306, release dates 326 for replacement products 332, and prerequisites 330 for replacement products 332 identified in configuration information 320 (step 802). End of life dates 328 may also be for replacement products 332. In these examples, end of life dates 328 indicate at least one of an end of support date, an end of life date, and an end of extended support date.

In step 802, upgrade process 314 may obtain end of life dates 328, release dates 326, and prerequisites 330 for replacement products 332 from vendors for products 306. In some examples, the vendors may not be able to provide all of end of life dates 328 for products 306. Upgrade process 314 may obtain the needed end of life dates 328 by selecting, for example, default end of life dates.

Further, in step 802, upgrade process 314 may obtain other product information 324 in addition to end of life dates 328 and prerequisites 330. For example, upgrade process 314 may obtain release dates 326 for products 306 and/or replacement products 332. Upgrade process 314 may also obtain an identification of replacement products 332.

Upgrade process 314 then identifies number of changes 342 to plurality of computers 312 based on configuration information 320 and set of prerequisites 344 in prerequisites 330 for each replacement product in a plurality of replacement products in replacement products 322 for a plurality of products in products 306 (step 804).

Upgrade process 314 then generates number of upgrade plans 318 to implement number of changes 342 to plurality of computers 312 in which a number of overlaps between life cycles for the plurality of replacement products and life cycles for the plurality of products is increased (step 808), with the process terminating thereafter. Each upgrade plan in number of upgrade plans 318 reduces a number of deployments to network data processing system 302 over a period of time. This reduction in number of deployments is from performing a deployment on the network to upgrade a product each time a replacement product is available for upgrading.

Figure 9:
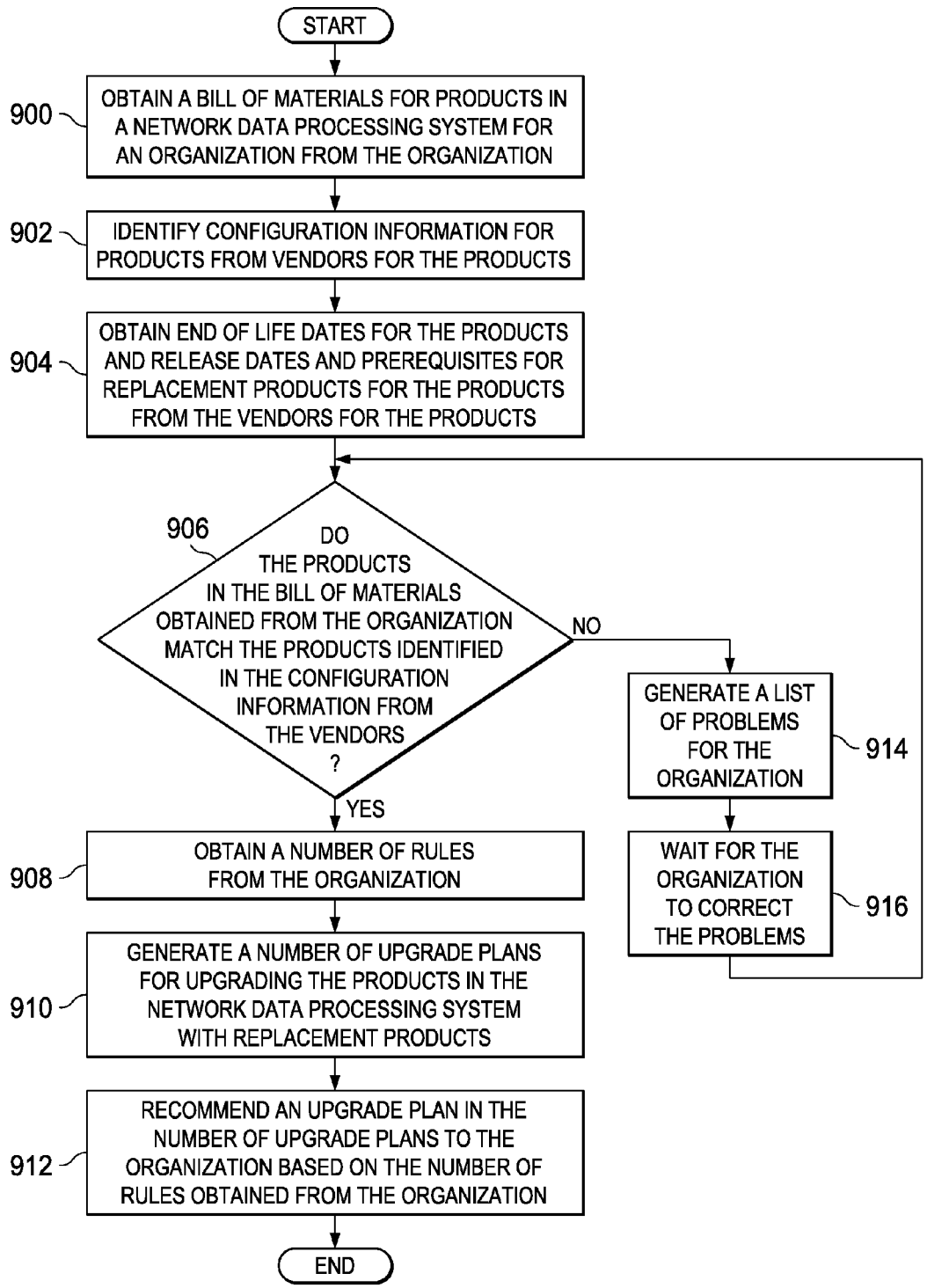
FIG. 9 is a flowchart illustrating a process to plan upgrades to a network data processing system in accordance with an illustrative embodiment.

Turning now to FIG. 9, a flowchart illustrating a process to plan upgrades to a network data processing system is depicted in accordance with an illustrative embodiment. In this example, the process in FIG. 9 may be implemented in upgrade process 314 in FIG. 3. In this illustrative example, the process in FIG. 9 is implemented by consulting service 317 in FIG. 3.

The process begins by upgrade process 314 obtaining a bill of materials for products 306 in network data processing system 302 for organization 304 from organization 304 (step 900). The bill of materials includes an identification of products 306 in plurality of computers 312 in network data processing system 302 and information about products 306.

Upgrade process 314 then identifies configuration information 320 for products from vendors for products 306 (step 902). Upgrade process 314 obtains end of life dates for products 306 and release dates and prerequisites 330 for replacement products 332 for products 306 from the vendors for products 306 (step 904).

The release date for a product is the date when the product is made available by the vendor. In these examples, the end of life date may be the last date at which the product is supported or the last date at which the product is offered for sale. Prerequisites for a product include, for example, without limitation, the hardware and/or software programs needed to operate the replacement program. End of life dates, release dates, and prerequisites may be obtained from, for example, a database managed by the vendors.

Upgrade process 314 then determines whether products 306 in the bill of materials obtained from organization 304 match the products identified in configuration information 320 from the vendors (step 906). In step 906, product names, current version names, vendor names, and/or other suitable information in the bill of materials are compared to the configuration information obtained from the vendors.

If all of the products in the bill of materials match the products identified in the configuration information from the vendors, upgrade process 314 then obtains a number of rules from organization 304 (step 908). The number of rules are rules that organization 304 has selected or specified for deploying products on network data processing system 302. For example, a rule may be that a release of a product into a network data processing system must take at least some minimum period of time. Another example of a rule may be that a release of a product into a network may not occur during certain periods of time.

Upgrade process 314 then generates number of upgrade plans 318 for upgrading products 306 in network data processing system 302 with replacement products 332 (step 910). Upgrade process 314 recommends an upgrade plan in number of upgrade plans 318 to organization 304 based on the number of rules obtained from organization 304 (step 912), with the process terminating thereafter. In step 912, when recommending an upgrade plan to organization 304, upgrade process 314 may also send organization 304 a list of replacement products 332 that are compatible, a list of replacement products 332 that are not compatible, and a list of end of life dates 328 for replacement products 332. The upgrade plan recommended may also include the supportability of the network data processing system if the upgrade plan is implemented.

With reference again to step 906, if all of the products identified in the bill of materials do not match the products identified in the configuration information from the vendors, upgrade process 314 generates a list of problems for organization 304 (step 914). Upgrade process 314 then waits for organization 304 to correct the problems (step 916), with the process proceeding to step 906 as described above. Organization 304 may correct the problems by modifying their bill of materials.

Figure 10:
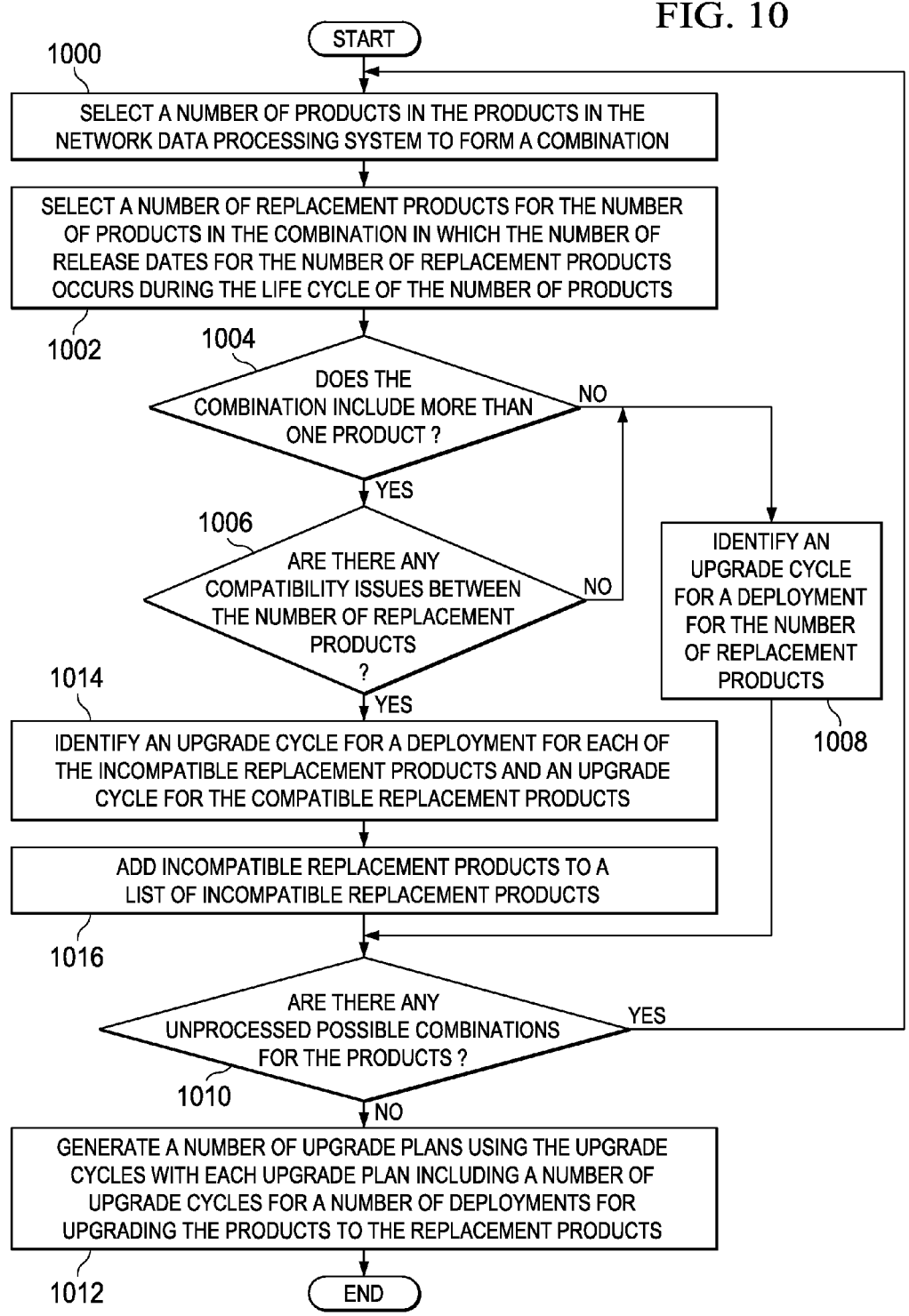
FIG. 10 is a flowchart of a process for generating upgrade plans in accordance with an illustrative embodiment.

With reference now to FIG. 10, a flowchart of a process for generating upgrade plans is depicted in accordance with an illustrative embodiment. The process illustrated in FIG. 10 is a more detailed process of step 910 in FIG. 9. The process may be implemented in network environment 300 in FIG. 3. In particular, the process may be implemented using upgrade process 314 in FIG. 3.

Upgrade process 314 begins by selecting a number of products in the products in the network data processing system to form a combination (step 1000). The combination may be one or more products. Upgrade process 314 selects a number of replacement products for the number of products in the combination in which the number of release dates for the number of replacement products occurs during the life cycle of the number of products (step 1002). In step 1002, the number of replacement products is selected such that the release dates for the number of replacement products are before the end of life dates for the number of products.

Upgrade process 314 then determines whether the combination includes more than one product (step 1004). If the combination includes more than one product, upgrade process 314 determines whether there are any compatibility issues between the number of replacement products (operation 1006). For example, a compatibility issue may be present when one replacement product is not compatible with another replacement product. In other words, the two replacement products may not be able to operate together in the same network data processing system.

If there are no compatibility issues, upgrade process 314 identifies an upgrade cycle for a deployment for the number of replacement products (step 1008). The upgrade cycle has a start date that is the latest release date for the number of replacement products. The upgrade cycle has an end date that is the earliest end of life date for the number of products. In this manner, the upgrade cycle has a length that is the difference between the end date and the start date.

Upgrade process 314 then determines whether there are any unprocessed possible combinations for the products (step 1010). If there are unprocessed possible combinations for the products, upgrade process 314 then returns to operation 1000 as described above. Otherwise, upgrade process 314 generates a number of upgrade plans using the upgrade cycles with each upgrade plan including a number of upgrade cycles for a number of deployments for upgrading the products to the replacement products (step 1012), with the process terminating thereafter.

In step 1012, the upgrade cycles generated may be merged and added to form an upgrade plan. For example, three upgrade cycles that overlap may be merged into a new upgrade cycle that has a start date that is the latest start date of the three upgrade cycles and an end date that is the earliest end date of the three upgrade cycles. A fourth upgrade cycle that does not overlap with the other three upgrade cycles is added to the upgrade plan such that the new upgrade cycle and the fourth upgrade cycle form the upgrade plan.

In this manner, an upgrade plan includes at least one upgrade cycle with at least one deployment. An upgrade plan does not include the deployment of incompatible products. In other words, the products deployed in an upgrade plan are all compatible. Further, an upgrade plan provides the deployment of all the replacement products for the products needing to be upgraded in the network data processing system when replacement products are available from vendors. The number of upgrade plans generated in step 1012 is used to select an upgrade plan to recommend that upgrade plan in the process described in step 912 in FIG. 9.

With reference again to step 1006, if there are compatibility issues between the number of replacement products, upgrade process 314 identifies an upgrade cycle for a deployment for each of the incompatible replacement products and an upgrade cycle for the compatible replacement products (step 1014). The upgrade cycle for the compatible replacement products has a start date that is the latest release date for the compatible replacement products and an end date that is the earliest end of life date for the corresponding products. The upgrade cycles for the incompatible replacement products each have a start date that is the release date of the replacement product and an end date that is the end of life date for the product.

Upgrade process 314 then adds the incompatible replacement products to a list of incompatible replacement products (step 1016). This list may be sent to organization 304, for example. Upgrade process 314 then continues to step 1010 as described above.

With reference again to step 1004, if the combination does not include more than one product, upgrade process 314 continues to step 1008 as described above.

The flowcharts and block diagrams in the different depicted embodiments illustrate the architecture, functionality, and operation of some possible implementations of apparatus, methods, and computer program products. In this regard, each block in the flowcharts or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be performed substantially concurrently, or the blocks may sometimes be performed in the reverse order, depending upon the functionality involved.

Thus, the different illustrative embodiments provide a method and apparatus for planning or making changes to a network data processing system. In the different illustrative examples, upgrades to products currently used in a network data processing system can be planned in a manner that reduces the number of times that the changes have to be performed. In other words, with one or more of the different illustrative embodiments, the number of releases in upgrading products is reduced. With one or more of the different illustrative examples, the reduction in the number of releases needed to upgrade products reduces the time and expense needed to make changes. By upgrading products in the same release, some expenses in labor and materials may be reduced. Further, the amount of time in which inconveniences to users of the network data processing system also may be reduced. With one or more of the different illustrative embodiments, a tool in the form of an upgrade process is present in which life cycle management of products within the network data processing system may be integrated. As a result, changes to the network data processing system may be made with a view of how the different products interrelate or affect each other in a manner that is currently unavailable. In this manner, the amount of planning by administrators of a network data processing system also may be reduced.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer readable storage device providing program code for use by or in connection with a computer or any instruction processing system. For the purposes of this description, a computer readable storage device can be any tangible apparatus that can store the program for use by or in connection with the instruction processing system, apparatus, or device.

The medium can be an electronic, magnetic, optical, or semiconductor system (or apparatus or device). Examples of a computer readable storage device include a semiconductor or solid state memory, magnetic tape, a removable computer diskette, a random access memory (RAM), a read-only memory (ROM), a rigid, portable or stationary magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories, which provide temporary storage of at least some program code in order to reduce the number of times code must be retrieved from bulk storage during running of the program code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for upgrading a plurality of software programs installed in a data processing system, the method comprising:
   determining, by one or more processors, respective end of life dates for the plurality of installed software programs, wherein the plurality of installed software programs are no longer generally available from their respective vendors after the respective end-of-life dates;
   determining, by one or more processors, respective release dates of a plurality of replacement software programs for the respective plurality of installed software programs, wherein the release dates of the respective replacement software programs are dates in the future and pre-date the end-of-life dates for the respective installed software programs;
   determining, by the one or more processors, a common time period between all of the release dates for all of the respective replacement software programs and all of the end-of-life dates for all of the respective installed software programs;
   generating, by one or more processors, a report of the common time period and the list of currently installed software programs and corresponding replacement software programs to advise an administrator that all of the installed software programs can be replaced with the corresponding replacement software programs during the common time period; and
   generating, by one or more processors, an upgrade plan to replace the installed software programs with the corresponding replacement software programs in the data processing system based on the common time period and configuration information about hardware and software within the data processing system.

2. The method according to claim 1, wherein the plurality of software programs are upgraded by replacing a first one of the plurality of software programs with a first replacement software program that is a new version of the first one of the plurality of software programs, and by replacing a second one of the plurality of software programs with a second replacement software program that is a new version of the second one of the plurality of software programs during the overlap upgrade cycle.

3. The method according to claim 1, further comprising:
   for each one of the plurality of software programs, determining prerequisites that are required by the replacement software program, wherein the prerequisites include an identification of hardware that is needed by the replacement software program before the replacement software program can be run.

4. The method according to claim 1, further comprising:
   for each one of the plurality of software programs, determining prerequisites that are required by the replacement software program, wherein the prerequisites include an amount of memory, a processor speed, and a type of operating system that are needed by the replacement software program before the replacement software program can be run.

5. A computer program product for upgrading a plurality of software programs, the computer program product comprising:
   one or more non-transitory computer-readable storage devices, and program instructions stored on the storage devices, the program instructions comprising:
   program instructions to determine respective end-of-life dates for the plurality of installed software programs, wherein the plurality of installed software programs are no longer generally-available from their respective vendors after the respective end-of-life dates;
   program instructions to determine respective release dates of a plurality of replacement software programs for the respective plurality of installed software programs, wherein the release dates of the respective replacement software programs are dates in the future and pre-date the end-of-life dates for the respective installed software programs;
   program instructions to determine a common time period between all of the release dates for all of the respective replacement software programs and all the end-of-life dates for all of the respective installed software programs;
   program instructions to generate a report of the common time period and the list of currently installed software programs and corresponding replacement software programs to advise an administrator that all of the installed software programs can be replaced with the corresponding replacement software programs during the common time period; and
   program instructions to generate an upgrade plan to replace the installed software programs with the corresponding replacement software programs in the data processing system based on the common time period and configuration information about hardware and software within the data processing system.

* * * * *